US009438579B2

(12) United States Patent
Evans et al.

(10) Patent No.: US 9,438,579 B2
(45) Date of Patent: Sep. 6, 2016

(54) PROCESSING DATA

(71) Applicant: Metaswitch Networks Ltd, Enfield (GB)

(72) Inventors: Michael Jeffrey Evans, Enfield (GB); Matthew Williams, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 10 days.

(21) Appl. No.: 14/166,819

(22) Filed: Jan. 28, 2014

(65) Prior Publication Data
US 2014/0325603 A1 Oct. 30, 2014

(30) Foreign Application Priority Data

Apr. 30, 2013 (GB) .................................. 1307811.8
May 3, 2013 (GB) .................................. 1308078.3
May 3, 2013 (GB) .................................. 1308080.9
Jan. 17, 2014 (GB) .................................. 1400841.1

(51) Int. Cl.
*H04L 29/06* (2006.01)
(52) U.S. Cl.
CPC .................................. *H04L 63/08* (2013.01)
(58) Field of Classification Search
CPC ....................................................... H04L 63/08
USPC .......................................... 726/4; 455/435.1
See application file for complete search history.

(56) References Cited

U.S. PATENT DOCUMENTS

| 2006/0136557 | A1 | 6/2006 | Schaedler et al. | |
| 2006/0149812 | A1* | 7/2006 | Lin et al. ....................... | 709/203 |
| 2007/0195805 | A1* | 8/2007 | Lindgren ....................... | 370/401 |
| 2008/0045214 | A1* | 2/2008 | Wen et al. .................. | 455/435.1 |
| 2008/0137671 | A1* | 6/2008 | Agarwal et al. .............. | 370/401 |

(Continued)

FOREIGN PATENT DOCUMENTS

| EP | 2230818 A1 | 9/2010 |
| WO | 2008054647 A1 | 5/2008 |

(Continued)

OTHER PUBLICATIONS

Adnan, "Securing Broker-less publish/subscribe Systems Using Identity-Based Encryption", Feb. 2014, IEEE, p. 518-528.*
3rd Generation Partnership Project; Technical Specification Group Services and Sytem Aspects; IP Multimedia Subsystem Aspects (IMA). Stage 2 (Release 5). Oct. 1, 2001.

*Primary Examiner* — Thanhnga B Truong
*Assistant Examiner* — Gregory Lane
(74) *Attorney, Agent, or Firm* — EIP US LLP

(57) ABSTRACT

At a network node separate from a subscriber configuration network node configured to store subscriber configuration data for a plurality of subscriber devices, a request to access configuration data associated with a subscriber stored at the subscriber configuration network node is received. In response to the received access request comprising a private user identity for the subscriber, but not a public user identity for the subscriber, the network node retrieves, from a user identity database configured to store user identity data for identifying subscribers in the network, a public user identity for the subscriber, the retrieval being carried out on the basis of the private user identity for the subscriber comprised in the received access request, and transmits an authorization request to the subscriber configuration network node comprising the public user identity retrieved from the user identity database and the private user identity comprised in the received access request.

18 Claims, 3 Drawing Sheets

(56) References Cited

U.S. PATENT DOCUMENTS

| | | |
|---|---|---|
| 2008/0155659 A1 | 6/2008 | Gazier et al. |
| 2008/0219241 A1* | 9/2008 | Leinonen et al. .............. 370/352 |
| 2008/0240084 A1 | 10/2008 | Tsukiashi et al. |
| 2008/0256083 A1 | 10/2008 | Wakefield |
| 2009/0023443 A1* | 1/2009 | Kieselmann et al. ........ 455/433 |
| 2009/0319641 A1 | 12/2009 | Verbandt et al. |
| 2010/0184480 A1 | 7/2010 | Borst et al. |
| 2011/0083014 A1* | 4/2011 | Lim .............................. 713/168 |
| 2011/0185070 A1* | 7/2011 | Xue ................... H04L 29/12066 709/227 |
| 2012/0092997 A1 | 4/2012 | Mihaly et al. |
| 2012/0207151 A1* | 8/2012 | Alt et al. ....................... 370/354 |
| 2013/0139241 A1* | 5/2013 | Leeder .................. H04W 12/06 726/9 |
| 2013/0155875 A1* | 6/2013 | Ayyasamy et al. ........... 370/242 |

FOREIGN PATENT DOCUMENTS

| | | |
|---|---|---|
| WO | 2009124594 A1 | 10/2009 |
| WO | 2011106690 A2 | 9/2011 |
| WO | 2011146844 A1 | 11/2011 |
| WO | 2012149966 A1 | 11/2012 |

* cited by examiner

PROCESSING DATA

CROSS REFERENCE TO RELATED APPLICATIONS

This application claims priority under 35 U.S.C. §119(a) to (1) UK patent application no. GB1307811.8, filed Apr. 30, 2013; (2) UK patent application no. GB 1308080.9, filed May 3, 2013; (3) UK patent application no. GB 1308078.3, filed May 3, 2013; and (4) UK patent application no. GB 1400841.1, filed Jan. 17, 2014. Each of the above-referenced patent applications is hereby incorporated by reference in its entirety.

TECHNICAL FIELD

The present disclosure relates to processing data. In particular, but not exclusively, the present disclosure relates to measures, including methods, apparatus and computer program products, for processing data in a telecommunications network.

BACKGROUND

Internet Protocol Multimedia System (IMS) networks have the concept of both public and private user identities. Public user identities are how one phone user (or 'subscriber') is identified by other phone users, for example when making a call, one user provides the public user identity of the other user they want to call. Private user identities are how the user identifies themselves to the core of the network; in particular, they can for example be used for authentication. Different types of subscriber data are associated with public user identities from private user identities, for example authentication credentials can be stored at the scope of a private user identity, as opposed to a public user identity.

The IMS architecture proposes a Home Subscriber Server (HSS) component, which stores this subscriber data and exposes it over a Cx interface. Authentication credentials can be retrieved from the HSS by using a Cx Multimedia-Auth-Request/Answer flow. This flow requires both a public and a private user identity to be provided, even though the underlying data is stored only at the scope of a private user identity.

SUMMARY

According to first embodiments, there is a method of processing data in a telecommunications network, the network comprising:

a subscriber configuration network node configured to store subscriber configuration data for a plurality of subscriber devices; and a user identity database configured to store user identity data for identifying subscribers in the network, the method comprising, at a network node separate from the subscriber configuration network node:

receiving a request to access configuration data associated with a subscriber stored at the subscriber configuration network node;

in response to the received access request comprising a private user identity for the subscriber, but not a public user identity for the subscriber:

retrieving, from the user identity database, a public user identity for the subscriber, the retrieval being carried out on the basis of the private user identity for the subscriber comprised in the received access request; and transmitting an authorization request to the subscriber configuration network node comprising the public user identity retrieved from the user identity database and the private user identity comprised in the received access request.

According to second embodiments, there is apparatus for use in processing data in a telecommunications network, the network comprising:

a subscriber configuration network node configured to store subscriber configuration data for a plurality of subscriber devices; and a user identity database configured to store user identity data for identifying subscribers in the network, the apparatus comprising a network node separate from the subscriber configuration network node, the apparatus comprising at least one processor, and at least one memory including computer program code, the at least one memory and the computer program code being configured to, with the at least one processor, cause the apparatus at least to:

receive a request to access configuration data associated with a subscriber from the subscriber configuration network node;

in response to the received access request comprising a private user identity for the subscriber, but not a public user identity for the subscriber:

retrieve, from the user identity database, a public user identity for the subscriber, the retrieval being carried out on the basis of the private user identity for the subscriber comprised in the received access request; and transmit an authorization request to the subscriber configuration network node comprising the public user identity retrieved from the user identity database and the private user identity comprised in the received access request.

According to third embodiments, there is a computer program product comprising a non-transitory computer-readable storage medium having computer readable instructions stored thereon, the computer readable instructions being executable by a computerized device to cause the computerized device to perform a method for processing data in a telecommunications network, the network comprising:

a subscriber configuration network node configured to store subscriber configuration data for a plurality of subscriber devices; and a user identity database configured to store user identity data for identifying subscribers in the network, the method comprising, at a network node separate from the subscriber configuration network node:

receiving a request to access configuration data associated with a subscriber from the subscriber configuration network node;

in response to the received access request comprising a private user identity for the subscriber, but not a public user identity for the subscriber:

retrieving, from the user identity database, a public user identity for the subscriber, the retrieval being carried out on the basis of the private user identity for the subscriber comprised in the received access request; and transmitting an authorization request to the subscriber configuration network node comprising the public user identity retrieved from the user identity database and the private user identity comprised in the received access request.

Further features of embodiments will become apparent from the following description of preferred embodiments, given by way of example only, which is made with reference to the accompanying drawings.

DETAILED DESCRIPTION

Figure 1:
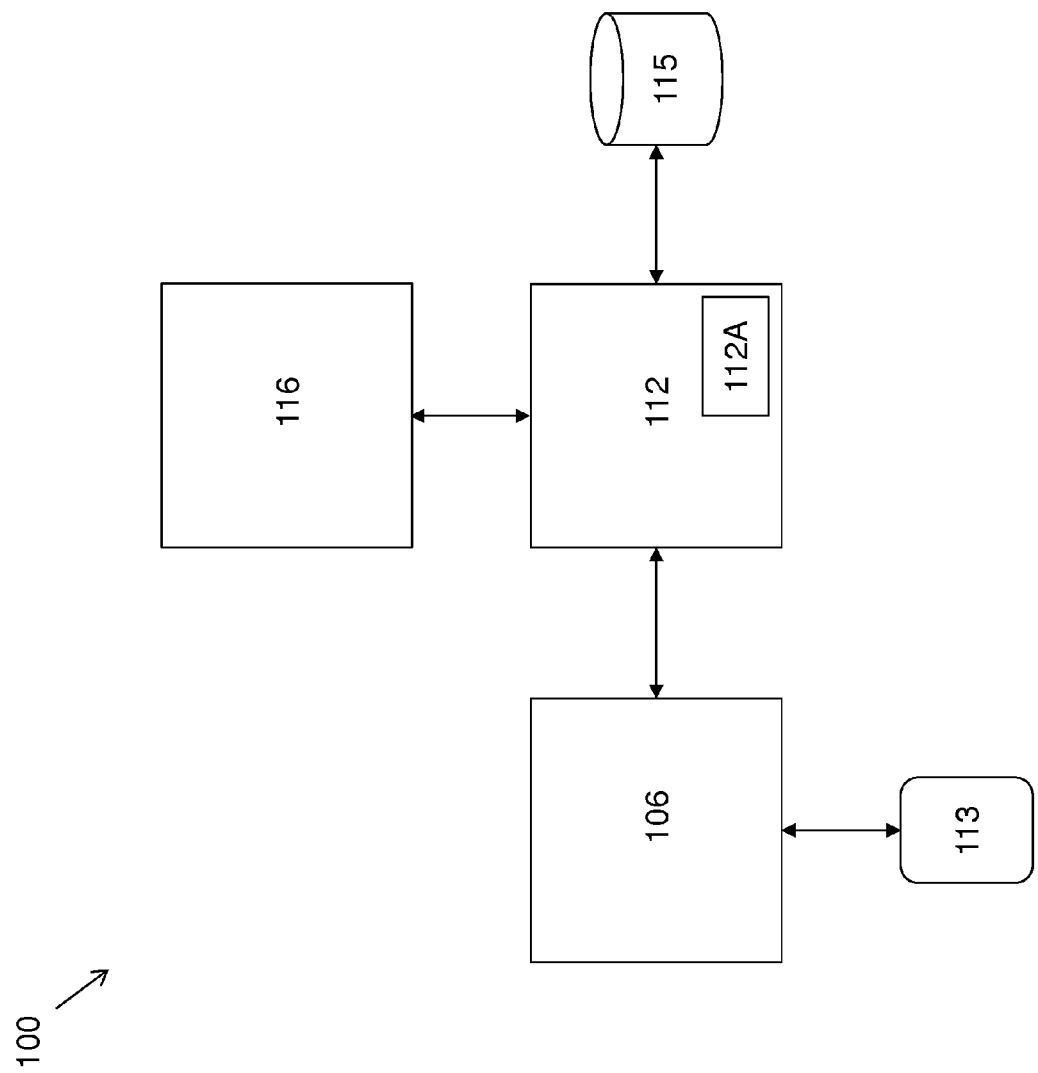
FIG. 1 shows an example telecommunications network in which embodiments of the present disclosure may be practiced.

FIG. 1 shows an example telecommunications network in which embodiments of the present disclosure may be practiced. Telecommunications network 100 comprises a client device (or node) 106, a subscriber configuration network node 116, a network node 112, and a user identity database 115.

Network node 112 comprises one or more processors and/or one or more memories 112A for performing various data processing tasks according to embodiments. Network node 112 is separate to subscriber configuration network node 116, but is configured to communicate with subscriber configuration network node 116, client device 106 and user identity database 115. In some embodiments, user identity database 115 is located separately to network node 112 and in other embodiments, user identity database 115 is located integrally to network node 112.

Subscriber configuration network node 116 is responsible for storing subscriber configuration data for subscriber devices in telecommunications network 100.

Client device 106 may comprise a subscriber device or a network node which is configured to communicate with network node 112, for example to transmit access requests to network node 112. In some embodiments, client device 106 comprises a network node from a cluster of network nodes responsible for conducting registration procedures for subscriber devices (such as subscriber device 113 which may for example comprise a cellular telephone) and/or processing routing data relating to communication sessions conducted in the network.

Embodiments comprise a network node (or 'component' or 'element') 112 which is configured to cache user identities in user identity database 115. In embodiments network node 112 presents a REST-ful HTTP interface based on an (IMS standard) Cx interface. In IMS, data is either associated with a public user identity or a private user identity (but not both). However, the Cx interface requires both to be provided on requests. Users of the HTTP interface don't always have both identities, so in embodiments, network node 112 caches the mapping between these identities so that it can build Cx interface requests even when one identity is absent.

Embodiments comprise caching the mapping from private user identity to public user identity so that network node 112 is able to construct a suitable authorization request (for example a Multimedia-Auth-Request) for transmittal to subscriber configuration network node 116 based on just a private user identity.

Embodiments comprise measures, including methods, apparatus and/or computer program products for use in processing data in telecommunications network 100. In embodiments, the network comprises subscriber configuration network node 116 configured to store subscriber configuration data for a plurality of subscriber devices, and user identity database 115 configured to store user identity data for identifying subscribers in the network.

In embodiments a request to access configuration data associated with a subscriber from subscriber configuration network node 116 is received at network node 112 separate from subscriber configuration network node 116. The access request may have been triggered by a Session Initiation Protocol (SIP) REGISTER event, for example in relation to subscriber device 113 attempting to register with the network. The access request may comprise a SIP digest authentication request.

In embodiments, in response to the received access request comprising a public user identity (for example public@example.com) and a private user identity (for example private@example.com) for the subscriber, network node 112 transmits an authorization request to subscriber configuration network node 116 comprising the public user identity and the private user identity for the subscriber.

In other embodiments, in response to the received access request comprising a private user identity for the subscriber, but not a public user identity for the subscriber, network node 112 retrieves, from user identity database 115, a public user identity for the subscriber, where the retrieval is carried out on the basis of the private user identity for the subscriber comprised in the received access request; in such embodiments, network node 112 then transmits an authorization request to subscriber configuration network node 116 comprising the public user identity retrieved from the user identity database and the private user identity comprised in the received access request.

In embodiments, the user identity database comprises a cache configured to store mappings between public and private user identities associated with subscribers. In such embodiments network node 112, prior to receipt of the access request, caches a mapping between the public user identity and the private user identity for the subscriber in user identity database 115. In embodiments, the mapping is cached in relation to a previous access request for the subscriber received at the separate network node 112.

In embodiments, multiple public user identities map to the same private user identity. Any valid public user identity can be acceptable in an authorization request such as a Multimedia-Auth-Request message, so in embodiments the most recently-used public user identity for each private user identity is employed.

In embodiments, in response to transmittal of the authorization request, network node 112 receives a successful authentication response from subscriber configuration network node 116. In embodiments, in response to receipt of the successful authentication response from the subscriber configuration network node, network node 112 updates the cached mapping between the public user identity and the private user identity for the subscriber in user identity database 115.

In embodiments, network node 112 receives the requested configuration data for the subscriber from subscriber configuration network node 116. In embodiments, the access request was received from client device 106 in the network, and network node 112 transmits the configuration data for the subscriber received from subscriber configuration network node 116 to client device 106.

In some embodiments, the access request comprises a public user identity for the subscriber and a private user identity for the subscriber and is associated with a SIP flow. In other embodiments, the access request comprises a private user identity for the subscriber, but not a public user identity for the subscriber and is associated with a Traversal Using Relay Network Address Translation (TURN) flow. Note that in some embodiments, different devices/nodes may handle SIP flows than those which handle TURN flows.

In embodiments, telecommunications network 100 comprises an IMS network and subscriber configuration network node 116 comprises an HSS.

In embodiments, the authorization request is transmitted to and/or the successful authentication response is received via an IMS Cx interface of the separate network node.

In embodiments, the access request is received via a Hypertext Transfer Protocol (HTTP) interface of the separate network node. The HTTP interface may for example comprise a Representational State Transfer (REST)-ful HTTP Application Programming Interface (API).

In embodiments, network node 112 exposes two REST-ful HTTP APIs for retrieving authentication credentials—one that provides both the public user identity and the private user identity, and one that just provides the private user identity. Client device 106 uses the interface that includes both user identities if it has both available, and uses the interface that only includes the private user identity if that is all it has.

In embodiments, the separate network node comprises a first Representational State Transfer (REST)-ful HTTP Application Programming Interface (API) configured to accept a first type of access request comprising a public user identity and a private user identity for a given subscriber, and a second Representational State Transfer (REST)-ful HTTP Application Programming Interface (API) configured to accept a second type of access request comprising a public user identity, but not a private user identity for a given subscriber.

If for example network node 112 receives a REST-ful HTTP API request with both the public user identity and the private user identity, it constructs a Multimedia-Auth-Request message containing both these identities for transmittal to subscriber configuration network node 116. If network node 112 receives a REST-ful HTTP API request with just the private user identity, it looks up the corresponding public user identity in user identity database 115 and then constructs a Multimedia-Auth-Request message using this public user identity and the provided private user identity for transmittal to the subscriber configuration network node 116.

Figure 2:
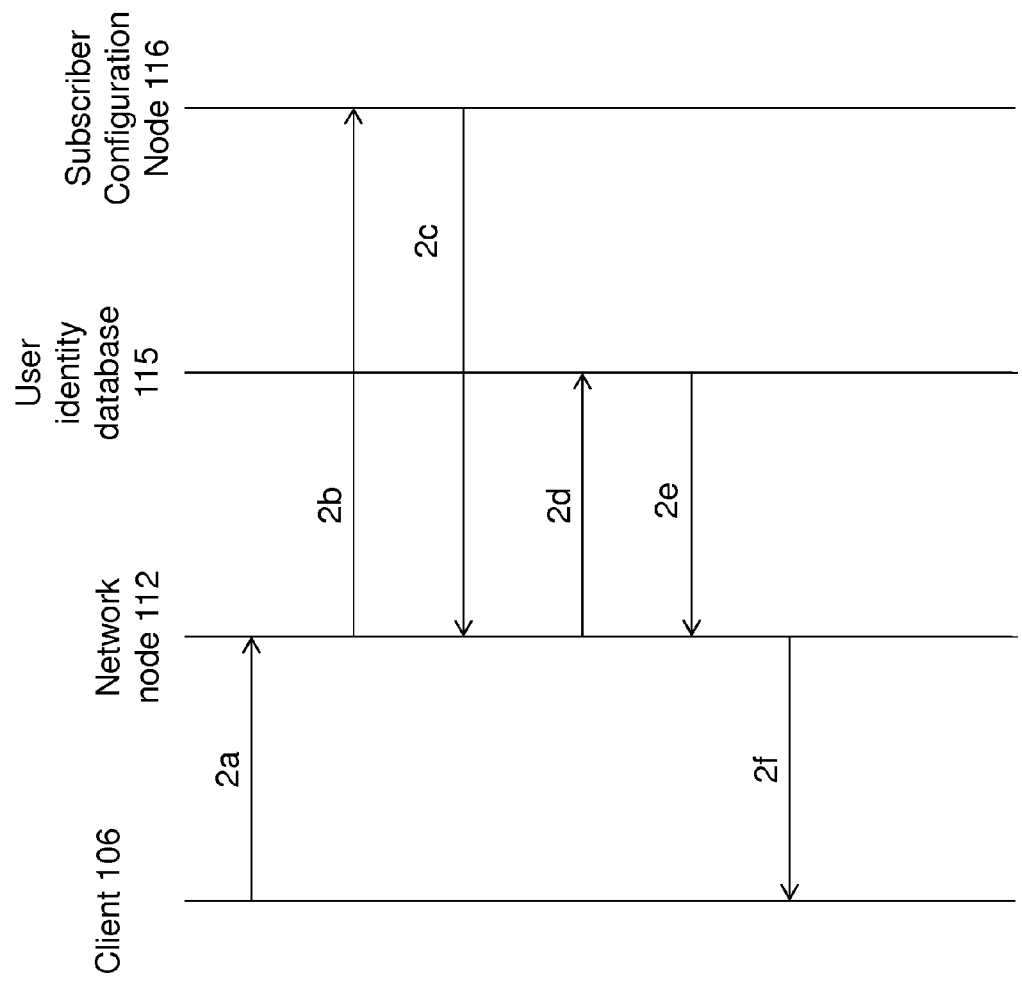
FIG. 2 shows a flow diagram according to embodiments.

FIG. 2 shows a flow diagram according to embodiments. In step 2a, client device 106 transmits to network node 112 a request to access configuration data associated with a subscriber from subscriber configuration network node 116. The access request of step 2a comprises a public user identity and a private user identity for the subscriber. In step 2b, in response to receipt of the access request comprising a public user identity and a private user identity for the subscriber of step 2a, network node 112 transmits an authorization request to subscriber configuration network node 116 comprising the public user identity and the private user identity for the subscriber. Subscriber configuration node 116 authorises the access request on the basis of the public user identity and a private user identity for the subscriber comprised in the authorization request of step 2b and transmits a successful authentication response to network node 112 in step 2c. In embodiments, the configuration data requested by client 106 in access request 2a is transmitted to network node 112 in conjunction with the successful authentication response of step 2c.

In step 2d, network node 112 caches a mapping between the public user identity and the private user identity for the subscriber in user identity database 115; if there was already a mapping between the public user identity and the private user identity for the subscriber stored in user identity database 115, then this caching updates the existing mapping stored in user identity database 115. User identity database 115 confirms the caching of step 2d to network node 112 in step 2e. In step 2f, network node 112 transmits the configuration data for the subscriber received from subscriber configuration node 116 to client 106.

In the embodiments of FIG. 2 described above, step 2f is depicted as occurring after steps 2d and 2e. In alternative embodiments, step 2f is carried out before one or more of steps 2d and 2e. Such embodiments may provide improved latency.

Figure 3:
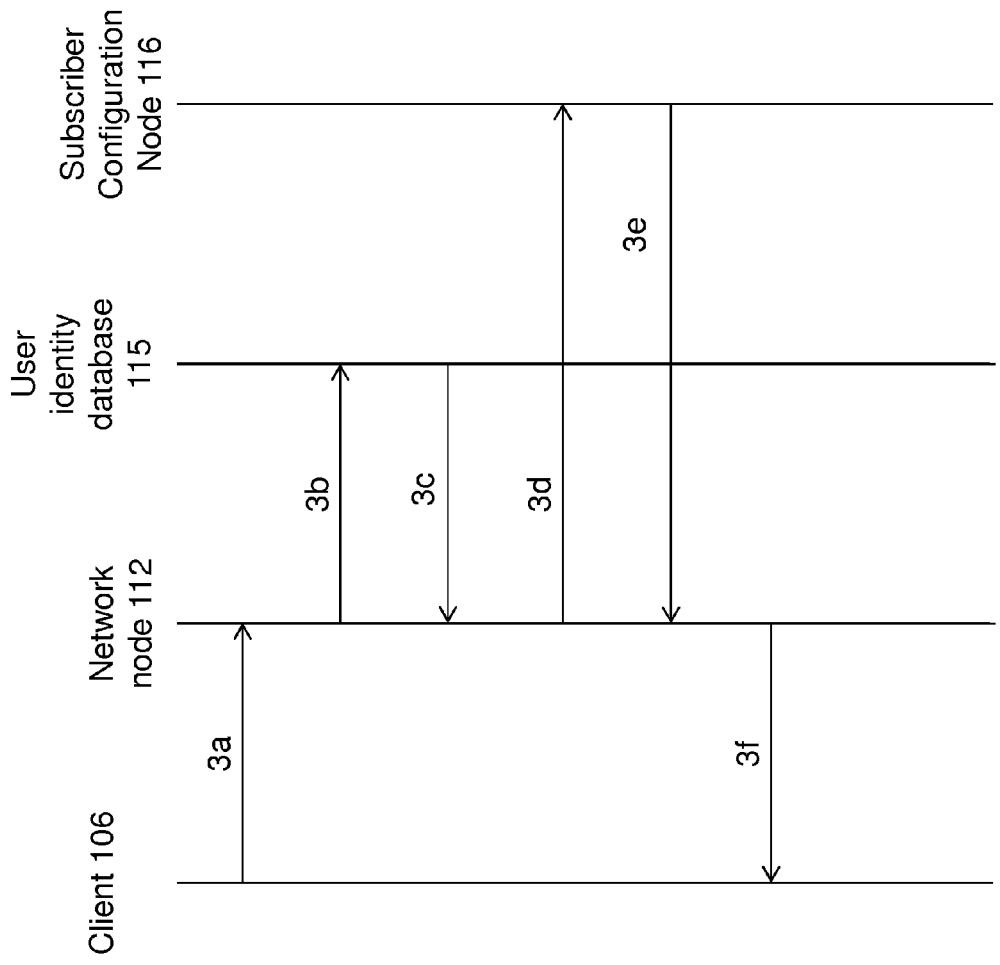
FIG. 3 shows a flow diagram according to embodiments.

FIG. 3 shows a flow diagram according to embodiments. In step 3a, client device 106 transmits to network node 112 a request to access configuration data associated with a subscriber from subscriber configuration network node 116. The access request of step 3a comprises a private user identity for the subscriber, but not a public user identity for the subscriber. In steps 3b and 3c, in response to receipt of the access request comprising a private user identity for the subscriber, but not a public user identity for the subscriber of step 3a, network node 112 retrieves, from user identity database 115, a public user identity for the subscriber; the retrieval is carried out on the basis of the private user identity for the subscriber comprised in the received access request of step 3a. In step 3d, network node 112, transmits an authorization request to subscriber configuration network node 116 comprising the public user identity retrieved from user identity database 115 in steps 3b and 3c and the private user identity comprised in the received access request of step 3a.

Subscriber configuration node 116 authorises the access request on the basis of the public user identity and a private user identity for the subscriber comprised in the authorization request of step 3d and transmits a successful authentication response to separate node 112 in step 3e. In embodiments, the configuration data requested by client 106 in access request 3a is transmitted to network node 112 in conjunction with the successful authentication response of step 3e. In step 3f, network node 112 transmits the configuration data for the subscriber received from subscriber configuration node 116 to client 106.

In embodiments, in response to step 3e, network node 112 caches (not shown) a mapping between the public user identity and the private user identity for the subscriber in user identity database 115; if there was already a mapping between the public user identity and the private user identity for the subscriber stored in user identity database 115, then this caching updates the existing mapping stored in user identity database 115. In embodiments, user identity database 115 confirms (not shown) this caching to network node 112.

Embodiments comprise a method of processing data in a telecommunications network, the network comprising:

a subscriber configuration network node configured to store subscriber configuration data for a plurality of subscriber devices; and a user identity database configured to store user identity data for identifying subscribers in the network, the method comprising, at a network node separate from the subscriber configuration network node:

receiving a request to access configuration data associated with a subscriber from the subscriber configuration network node, the received access request comprising a private user identity for the subscriber, but not a public user identity for the subscriber;

retrieving, from the user identity database, a public user identity for the subscriber, the retrieval being carried out on the basis of the private user identity for the subscriber comprised in the received access request; and transmitting an authorization request to the subscriber configuration network node comprising the public user identity retrieved from the user identity database and the private user identity comprised in the received access request.

The above embodiments are to be understood as illustrative examples of the present disclosure. Further embodiments of the present disclosure are envisaged.

In alternative embodiments, client device 106 communicates directly with user identity database 115. In some such embodiments both public and private user identities are provided to network node 112. In some such embodiments both public and private user identities are always provided to network node 112.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A method of constructing authorization requests in a telecommunications network, the method comprising:
   receiving, at a network node separate from a subscriber configuration network node, a request to access configuration data associated with a subscriber stored at the subscriber configuration network node wherein the received access request comprises a private user identity for the subscriber, but not a public user identity for the subscriber, and wherein the subscriber configuration network node is configured to store subscriber configuration data for a plurality of subscriber devices;
   retrieving, at the network node separate from the subscriber configuration network node, in response to the received access request, a public user identity for the subscriber from a user identity database configured to store user identity data for identifying subscribers in the telecommunications network, the retrieval of the public user identity being carried out based on the private user identity for the subscriber included in the received access request, wherein the user identity database is separate from the subscriber configuration network node; and
   transmitting, at the network node separate from the subscriber configuration network node, an authorization request to the subscriber configuration network node, wherein the transmitted authorization request comprises the public user identity retrieved from the user identity database and the private user identity comprised in the received access request.

2. The method of claim 1, further comprising:
   transmitting in response to the received access request, an authorization request to the subscriber configuration network node, wherein the transmitted authorization request includes the public user identity and the private user identity for the subscriber.

3. The method of claim 1, wherein the user identity database comprises a cache configured to store mappings between public and private user identities associated with subscribers, and wherein the method further comprises caching, prior to receipt of the access request, a mapping between the public user identity and the private user identity for the subscriber in the user identity database.

4. The method of claim 3, wherein the mapping is cached in relation to a previous access request for the subscriber received at the separate network node.

5. The method of claim 1, further comprising:
   receiving, in response to transmittal of the transmitted authorization request, a successful authentication response from the subscriber configuration network node.

6. The method of claim 5, further comprising:
   updating, in response to receipt of the successful authentication response from the subscriber configuration network node, the cached mapping between the public user identity and the private user identity for the subscriber in the user identity database.

7. The method of claim 5, further comprising receiving the requested configuration data for the subscriber from the subscriber configuration network node.

8. The method of claim 7, wherein the received access request is received from a client device in the network, and wherein the method further comprises transmitting, to the client device, the configuration data for the subscriber received from the subscriber configuration network node.

9. The method of claim 1, wherein the received access request comprises a public user identity for the subscriber and a private user identity for the subscriber, and wherein the access request is associated with a Session Initiation Protocol (SIP) flow.

10. The method of claim 1, wherein the received access request comprises a private user identity for the subscriber, but not a public user identity for the subscriber, and wherein the received access request is associated with a Traversal Using Relay Network Address Translation (TURN) flow.

11. The method of claim 1, wherein the telecommunications network comprises an Internet Protocol Multimedia System (IMS) network and the subscriber configuration network node comprises a Home Subscriber Server (HSS).

12. The method of claim 11, wherein the transmitted authorization request is transmitted to an Internet Protocol Multimedia Subsystem (IMS) Cx interface of the separate network node, and/or wherein the successful authentication response is received via the Internet Protocol Multimedia Subsystem (IMS) Cx interface of the separate network node.

13. The method of claim 1, wherein the transmitted access request is received via a Hypertext Transfer Protocol (HTTP) interface of the separate network node.

14. The method of claim 13, wherein the HTTP interface comprises a Representational State Transfer (REST)-ful HTTP Application Programming Interface (API).

15. The method of claim 1, wherein the separate network node comprises:
   a first Representational State Transfer (REST)-ful HTTP Application Programming Interface (API) configured to accept a first type of access request comprising a public user identity and a private user identity for a given subscriber; and
   a second Representational State Transfer (REST)-ful HTTP Application Programming Interface (API) configured to accept a second type of access request comprising a public user identity, but not a private user identity for a given subscriber.

16. The method of claim 1, wherein the network comprises a cluster of network nodes responsible for conducting registration procedures for subscriber devices and/or processing routing data relating to communication sessions conducted in the network, and wherein the access request is received from a network node in the cluster of network nodes.

17. An apparatus for use in constructing authorization requests in a telecommunications network, the network comprising:
 a subscriber configuration network node configured to store subscriber configuration data for a plurality of subscriber devices; and
 a user identity database configured to store user identity data for identifying subscribers in the network,
 the apparatus comprising a network node separate from the subscriber configuration network node, the apparatus comprising at least one processor, and at least one memory including computer program code, the at least one memory and the computer program code being configured to, with the at least one processor, cause the apparatus at least to:
 receive, at the network node separate from the subscriber configuration network node, a request to access configuration data associated with a subscriber from the subscriber configuration network node;
 in response to the received access request comprising a private user identity for the subscriber, but not a public user identity for the subscriber:
 retrieve, at the network node separate from the subscriber configuration network node, from the user identity database, a public user identity for the subscriber, the retrieval being carried out on the basis of the private user identity for the subscriber comprised in the received access request, wherein the user identity database is separate from the subscriber configuration network node; and
 transmit, at the network node separate from the subscriber configuration network node, an authorization request to the subscriber configuration network node comprising the public user identity retrieved from the user identity database and the private user identity comprised in the received access request.

18. A computer program product comprising a non-transitory computer-readable storage medium having computer readable instructions stored thereon, the computer readable instructions being executable by a computerized device to cause the computerized device to perform a method for constructing authorization requests in a telecommunications network, the network comprising:
 a subscriber configuration network node configured to store subscriber configuration data for a plurality of subscriber devices; and
 a user identity database configured to store user identity data for identifying subscribers in the network,
 the method comprising:
 receiving, at a network node separate from the subscriber configuration network node, a request to access configuration data associated with a subscriber from the subscriber configuration network node;
 in response to the received access request comprising a private user identity for the subscriber, but not a public user identity for the subscriber:
 retrieving, at the network node separate from the subscriber configuration network node, from the user identity database, a public user identity for the subscriber, the retrieval being carried out on the basis of the private user identity for the subscriber comprised in the received access request, wherein the user identity database is separate from the subscriber configuration network node; and
 transmitting, at the network node separate from the subscriber configuration network node, an authorization request to the subscriber configuration network node comprising the public user identity retrieved from the user identity database and the private user identity comprised in the received access request.

* * * * *